US012794970B2

(12) United States Patent
Griffin et al.

(10) Patent No.: US 12,794,970 B2
(45) Date of Patent: Nov. 10, 2026

(54) BUILDING CONTAINERIZED LAYERS USING PUBLISH-SUBSCRIBE TOPICS TO FACILITATE DATA CONSUMPTION

(71) Applicant: RED HAT, INC., Raleigh, NC (US)

(72) Inventors: Leigh Griffin, Waterford (IE); Christopher Foley, Waterford (IE)

(73) Assignee: Red Hat, Inc., Raleigh, NC (US)

( * ) Notice: Subject to any disclaimer, the term of this patent is extended or adjusted under 35 U.S.C. 154(b) by 28 days.

(21) Appl. No.: 18/782,747

(22) Filed: Jul. 24, 2024

(65) Prior Publication Data

US 2026/0032169 A1 Jan. 29, 2026

(51) Int. Cl.
*H04L 67/10* (2022.01)
*H04L 65/1063* (2022.01)

(52) U.S. Cl.
CPC .......... *H04L 67/10* (2013.01); *H04L 65/1063* (2013.01)

(58) Field of Classification Search
CPC ..... H04L 69/329; H04L 63/08; H04L 67/306; H04L 67/34; H04L 67/1097; H04L 67/12; H04L 67/02; H04L 67/10; G06F 3/0482; G06F 9/45558
See application file for complete search history.

(56) References Cited

U.S. PATENT DOCUMENTS 10,666,712 B1 * 5/2020 Dandekar ............... H04L 67/10
10,812,600 B1 * 10/2020 Naaman ................ H04L 67/141
11,269,939 B1 * 3/2022 Sammer .................. H04L 67/55
11,294,941 B1 * 4/2022 Sammer .............. G06F 16/2228
11,989,592 B1 * 5/2024 Kulkarni ............. H04L 63/0853
12,126,684 B1 * 10/2024 Sethi ........................ H04L 67/55
12,255,895 B2 * 3/2025 Damour .............. H04L 63/0876
2003/0046479 A1 * 3/2003 Noble ............... G06F 16/24564 711/100
2009/0270099 A1 * 10/2009 Gallagher .............. H04W 8/08 370/352
2010/0299763 A1 * 11/2010 Marcus ................... G06F 21/10 726/30
2011/0265077 A1 * 10/2011 Collison ................... G06F 8/60 717/172
2012/0089659 A1 * 4/2012 Halevi ................. G06Q 10/101 709/201
2013/0086279 A1 * 4/2013 Archer .................... H04L 65/80 709/233
2014/0330745 A1 * 11/2014 Hampapur ........... G06Q 10/067 705/348
2015/0039680 A1 * 2/2015 Gallant ............... H04L 12/1439 709/231
(Continued)

*Primary Examiner* — Ninos Donabed
(74) *Attorney, Agent, or Firm* — Kilpatrick Townsend & Stockton LLP

(57) ABSTRACT

A computing system can be provided for building containerized layers using publish-subscribe topics to facilitate software application data consumption. For example, the computing system may receive data that satisfies a set of data parameters using a publish-subscribe topic. The publish-subscribe topic can be a logical channel for receiving data streams with the data from computing nodes in a distributed computing environment. The computing system can then assemble one or more containerized layers, which can include the data. Additionally, the computing system can deploy the one or more containerized layers in a container at one of the computing nodes.

14 Claims, 3 Drawing Sheets

(56) References Cited

U.S. PATENT DOCUMENTS

| | | | | |
|---|---|---|---|---|
| 2017/0093700 | A1* | 3/2017 | Gilley | H04L 69/08 |
| 2017/0180289 | A1* | 6/2017 | Chiappone | G06F 9/542 |
| 2019/0095510 | A1* | 3/2019 | Cruise | G06F 16/24568 |
| 2020/0059376 | A1* | 2/2020 | Slovetskiy | H04L 12/1877 |
| 2020/0112539 | A1* | 4/2020 | Nalluri | H04L 61/5014 |
| 2020/0320034 | A1* | 10/2020 | Stawikowski | G06F 9/5055 |
| 2020/0320469 | A1* | 10/2020 | Fead | G06Q 10/087 |
| 2020/0374205 | A1* | 11/2020 | Sharma | H04L 67/10 |
| 2021/0067905 | A1* | 3/2021 | Feldbeine | G01C 21/3691 |
| 2021/0081823 | A1* | 3/2021 | Boguslawski | E21B 41/00 |
| 2021/0135489 | A1* | 5/2021 | Stites-Clayton | B60L 55/00 |
| 2021/0143980 | A1* | 5/2021 | Harris | H04L 9/0643 |
| 2021/0211515 | A1* | 7/2021 | Rozo | H04L 67/12 |
| 2021/0409444 | A1* | 12/2021 | Chifor | H04L 63/0227 |
| 2022/0084692 | A1* | 3/2022 | Wengrovitz | H04L 63/1458 |
| 2022/0090485 | A1* | 3/2022 | Boguslawski | E21B 43/128 |
| 2022/0303115 | A1* | 9/2022 | Khoury | H04L 9/0861 |
| 2022/0303127 | A1* | 9/2022 | Khoury | H04L 67/55 |
| 2023/0315785 | A1* | 10/2023 | Batsakis | G06F 16/2255<br>707/746 |
| 2024/0223656 | A1* | 7/2024 | Gomez | H04W 12/069 |
| 2025/0088376 | A1* | 3/2025 | Ren | H04L 9/3239 |

* cited by examiner

BUILDING CONTAINERIZED LAYERS USING PUBLISH-SUBSCRIBE TOPICS TO FACILITATE DATA CONSUMPTION

TECHNICAL FIELD

The present disclosure relates generally to data streaming in distributed computing environments. More specifically, but not by way of limitation, this disclosure relates to building containerized layers using publish-subscribe topics to facilitate software application data consumption.

BACKGROUND

Distributed computing systems (e.g., cloud computing systems, data grids, and computing clusters) have recently grown in popularity given their ability to improve flexibility, responsiveness, and speed over conventional computing systems. In some cases, the responsiveness and speed of distributed computing systems can be further improved by employing edge-computing solutions. Edge computing is a networking philosophy focused on bringing computing power and data storage as close to the source of the data as possible to reduce latency and bandwidth usage. In the edge-computing solutions, devices at an edge of the distributed computing environment that generate or consume data can be referred to as edge devices. The distributed computing environments may then employ edge nodes to perform various functions at the edge. For example, the edge nodes can store, perform local processing on, or perform other suitable tasks with respect to data generated at the edge devices.

DETAILED DESCRIPTION

Figure 1:
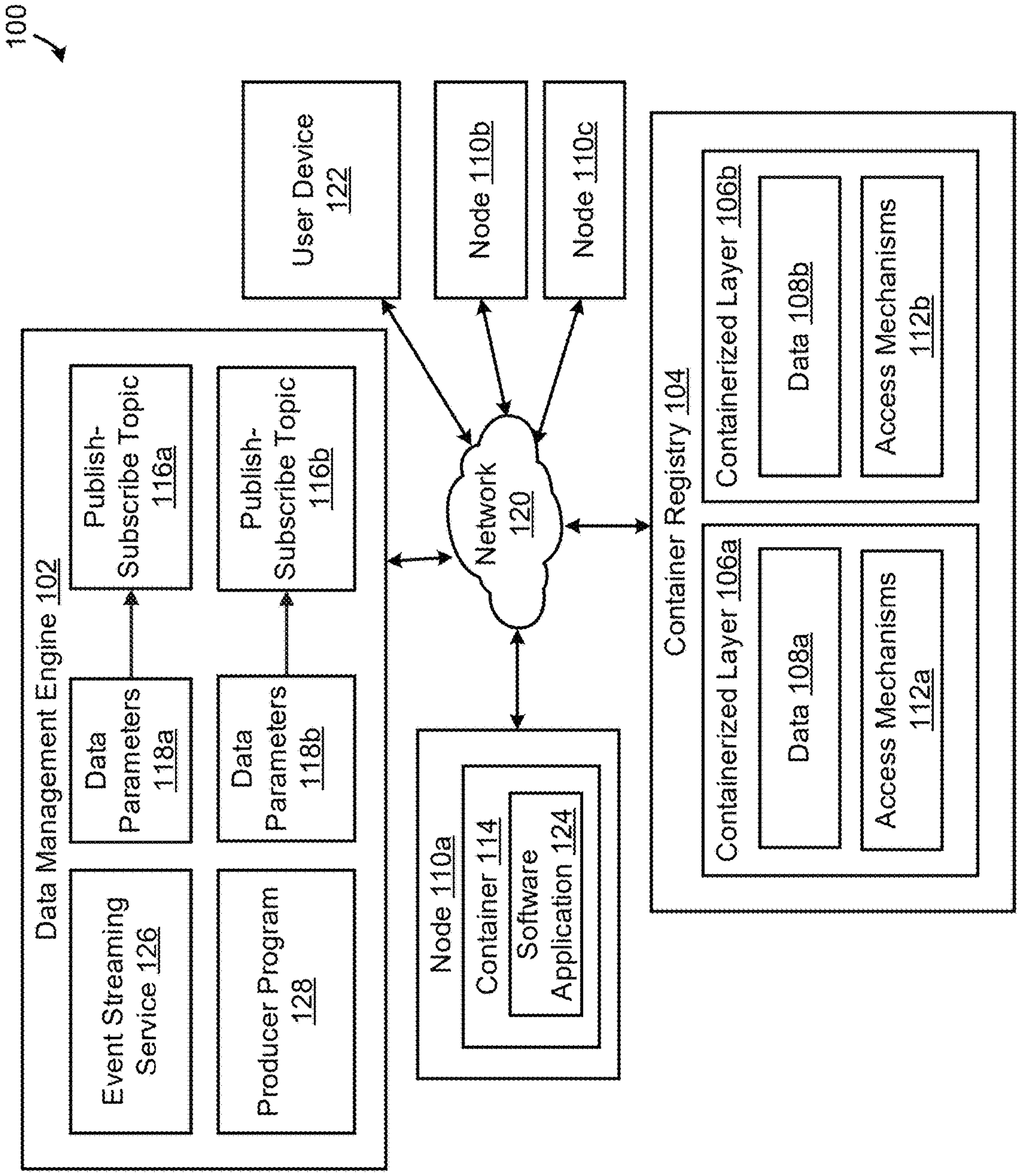
FIG. 1 is a block diagram of an example of a distributed computing environment for building containerized layers using publish-subscribe topics to facilitate software application data consumption according to some aspects of the present disclosure.

Various computing devices (also referred to herein as computing nodes), such as edge computing devices, may interact with data sources (e.g., data services running on other edge devices) within an access range to receive data. That is, the computing devices may continuously listen to and receive data from various data sources. As a result, the computing devices can receive a high volume of data, some of which may not be relevant or useful to software applications or other suitable software services running on the computing devices. Having to receive, process, store, etc. the high volume of data in an on-going manner can cause issues at the computing devices. For example, the high volume of incoming data and continuous listening to various data sources may strain computing resources (e.g., memory, battery, CPU, etc.), thereby causing latency in system performance, task performance, data processing, etc. at the computing devices. The high volume of data may further cause network congestion for a network associated with the computing devices, which may further hinder the ability of the computing devices to receive and transmit data. Moreover, determining which of the incoming data is relevant to or useful for the software applications and which of the incoming data is not relevant or useful may cause latency and impede performance at the software applications.

Some examples of the present disclosure can overcome one or more of the abovementioned problems by a system that can build containerized layers using data derived from a publish-subscribe topic. That is, the system can utilize the data collection and transportation power of publish-subscribe topics to aggregate data on behalf of a computing device (e.g., an edge device). For example, a software application executing on the computing device can transmit data parameters, which can define data of interest to the software application, to the system. The system can then construct and utilize a publish-subscribe topic to collect, filter, and store data according to the data parameters. The system can further assemble one or more containerized layers with the data and with access mechanisms for the data. Then system can then make the containerized layer available to the software application via, for example, a container registry. Therefore, rather than the computing device continuously listening for and consuming high volumes of data, the computing device can download the containerized layer and integrate the containerized layer with a container encompassing the software application. As a result, the software application can access the data natively. Using the containerized layer to enable native access to the data can require less computing resources and network bandwidth of the computing device than continuous collection of a high volume of data from various data sources. Native access to the data can also be more secure than receiving the data via a network. Additionally, because the publish-subscribe topic is constructed based on the data parameters, the system can facilitate the collection of highly relevant and useful data for the software application. This, in turn, can reduce latency and improve performance at the software application.

In one particular example, the system can receive a data request from a computing node (e.g., an edge device). The data request can include a set of data parameters (e.g., a type of data and one or more constraints for the type of data) for a containerized application running on the computing node. For example, the computing node can be a battery constrained edge device (e.g., a smart watch), and the containerized application can be a weather-related application running on the smart watch. Consequently, the type of data indicated in the set of data parameters can be temperature data. Additionally, the constraints for the type of data can specify data between ten degrees Celsius and twenty-five degrees Celsius is requested.

In response to receiving the data request, the system can aggregate data that satisfies the set of data parameters using a publish-subscribe topic. For example, the data management system may set up the publish-subscribe topic to receive a first stream of data from a first data service associated with weather data providers and a second stream of data from a second data service associated with Internet of Things (IoT) temperature sensors. The data management system can further specify data fields in the publish-subscribe topic to cause the public-subscribe topic to filter the data received via the data streams. As a result, the publish-subscribe topic can aggregate temperature data that is between ten degrees Celsius and twenty-five degrees Celsius from the weather data providers and IoT temperature sensors.

The system can then generate one or more containerized layers with the data collected via the publish-subscribe topic and may store the containerized layers in a container registry. In addition to storing the data, the containerized layers can include access mechanisms for the data. For example, the system can mount the data from a host machine via the container layer (e.g., link a directory or file on the host machine with the data to a file in the container layer). Additionally or alternatively, the system can include database drivers (e.g., SQL drivers, MongoDB drivers, or the like) in the containerized layers, which can be used to access the data.

Once the containerized layers are assembled, the system can deploy the containerized layers in a container running on the smart watch. In this way, the system can provide a means for the containerized application (e.g., the weather-related application) within the container to efficiently access to the data. That is, the containerized application can access the data natively (e.g., from the access mechanisms in the containerized layer). In comparison with the smart watch continuously receiving, processing, storing, or a combination there of the temperature data directly from each of the data services, computing resources and battery power of the smart watch can be used more efficiently by the system providing the smart watch access to the data via the containerized layer.

These illustrative examples are given to introduce the reader to the general subject matter discussed here and are not intended to limit the scope of the disclosed concepts. The following sections describe various additional features and examples with reference to the drawings in which like numerals indicate like elements but, like the illustrative examples, should not be used to limit the present disclosure.

FIG. 1 is a block diagram of an example of a distributed computing environment 100 for building containerized layers using publish-subscribe topics to facilitate software application data consumption according to some aspects of the present disclosure. Components within the distributed computing environment 100 may communicate using a network 120, such as the Internet or other suitable wide area network. The distributed computing environment 100 can include nodes 110*a-c*, a container registry 104, and a data management system 106. The nodes 110*a-c* can be any type of computing node such as compute nodes, edge nodes, application nodes, or the like. In examples in which the nodes 110*a-c* are edge nodes, the nodes can be located physically close to or within an access range of one or more data sources. In some examples, the nodes 110*a-c* can be responsible for data processing, analysis, storage, or a combination thereof within the distributed computing environment 100. The nodes 110*a-c* may further execute one or more containerized applications. Examples of the nodes 110*a-c* can include servers, routers, controllers, resource-constrained devices (e.g., microcontrollers, smart devices, sensors, etc.), smartphones, laptops, tablets, wearable devices, vehicles, Internet of Things (IoT) devices, etc.

In some examples, particular data may be desired at a particular node within the distributed computing environment 100. For example, the first node 110*a* can be a smartphone or other suitable edge device. It may be desirable to receive traffic data or the like at a software application 124 (e.g., a navigation application) running on the first node 110*a*. It may further be desirable to filter the data collected by the first node 110*a* to increase a relevancy of the data received at the software application 124 and maximize computing efficiency at the first node 110*a*. To facilitate the data filtering, data parameters 118*a* can be established and transmitted to the data management engine 102. The data parameters 118*a* can include a set of rules that define data of interest for the software application 124, govern data collection by a publish-subscribe topic 116*a*, or a combination thereof. In some examples, the data parameters 118*a* can be set by a user of a user device 122 and transmitted to the data management engine 102. The user device 122 can be communicatively coupled with the first node 110*a*, the data management engine 102, etc. via the network 120. The user device 122 can be a laptop, tablet, smartphone, or the like. In other examples, the data parameters can be set and transmitted to the data management engine 102 using the first node 110*a*.

As mentioned above, the data parameters 118*a* can define data of interest for the first node 110*a*. More specifically, the data parameters 118*a* can define data of interest to the software application 124 running on the first node 110*a*. The data parameters 118*a* can specify types of data, value ranges each type of data, an amount or limit for each type of data, or otherwise characterize or provide constraints for the data of interest. Additionally or alternatively, the data parameters 118*a* can define types of devices (e.g., traffic cameras, auto vehicles, etc.) or particular hardware of from each type of device (e.g., a particular type of sensor) from which the first node 110*a* desires data. For example, the data parameters 118*a* may specify traffic data for the type of data and may further specify a geographic area from which the traffic data is to be collected. The data parameters 118*a* may further indicate that the data should be collected from traffic cameras and vehicle cameras within the geographic area.

Upon receiving the data parameters 118*a*, the data management engine 102 may generate a publish-subscribe topic 116*a* based on the data parameters 118*a*. The publish-subscribe topic 116*a* can be a logical channel for receiving streams of data from computing nodes (e.g., nodes 110*b-c*) in the distributed computing environment 100. The publish-subscribe topic 116*a* may be part of an event streaming product 126, such as Apache® Kafka®. Therefore, the data management engine 102 may aggregate data from various computing locations (e.g., IOT devices, sensors, other suitable computing devices) using the event streaming product 126. More specifically, the data can be aggregated from software programs (e.g., microservices, software applications, etc.), databases, or the like using the event streaming product 126.

To generate the publish-subscribe topic 116*a*, the data management engine 102 may receive a pre-configured producer program. In other examples, the data management engine 102 can generate a producer program 128 based on the data parameters 118*a*. In either case, the producer program 128 can be a software program or software application component that can collect, aggregate, and send data to the publish-subscribe topic 116*a*. The publish-subscribe topic 116*a* and the data management engine 102 can be associated with one or more servers at which the data from the producer program 128 can be stored. To collect and aggregate data corresponding to the data parameters 118*a*, the producer program 128 can include data fields. The data fields can be set based on the data parameters 118*a*. For example, there can be a data field indicating that traffic data is desired and another data field indicating particular traffic cameras or edge devices associated with one or more of the traffic cameras from which traffic data is desired. In some examples, the producer program 128 can further include criteria for the data (e.g., a value range).

The producer program 128 can then be deployed by the data management engine 102 at one or more nodes (e.g., edge devices) to facilitate data collection at the publish-subscribe topic 116*a*. For example, a second node 110*b* can be an edge device connected to one or more traffic cameras. Thus, the data management engine 102 may deploy the producer program 128 at the second node 110*b*. Due to the deployment of the producer program 128 and the data fields within the producer program 128 being based on the data parameters 118*a*, data 108*a* received by the publish-subscribe topic 116 from the second node 110*b* can satisfy the rules set forth in the data parameters 118*a*. The producer program 128 can also be deployed at other nodes (e.g., a third node 110*c*) to obtain additional data 108*a*.

Additionally, the publish-subscribe topic 116*a* can expire after a period of time. The period of time can be governed by a rule in the data parameters 118*a*. For example, the data parameters 118*a* can include a rule indicating that the publish-subscribe topic 116*a* should be active (e.g., continuously receiving relevant data) for an hour, week, month, or other suitable period of time. After the period of time, the data management engine 102 can stop the collection of data by disabling the producer program 128, deleting the publish-subscribe topic 116*a*, or otherwise preventing the on-going collection of data.

Once the publish-subscribe topic has expired, the data management engine 102 can assemble a containerized layer 106*a* with the data 108*a* collected using the publish-subscribe topic 116*a*. For example, the data 108*a* can be stored in a file or other suitable format in the containerized layer 106*a*. In addition to storing the data 108*a*, the containerized layer 106*a* can include access mechanisms 112*a* for the data. For example, the data management engine 102 can mount the data from a host machine (e.g., one of nodes 110*b-c*) via the containerized layer 10*a*. That is, the data management engine 102 can, link a directory or file on the one of the nodes 110*b-c*, which can include at least some of the data 108*a*, to a file in the containerized layer 106*a*. Additionally or alternatively, the data management engine 102 can include database drivers (e.g., SQL drivers, MongoDB drivers, or the like) or other suitable access mechanisms for the data 108*a* in the containerized layer 106*a*.

After assembling the containerized layer 106*a*, the data management engine 102 may store the containerized layer 106*a* in a container registry 104. The container registry 104 can be accessible by the nodes 110*a-c* via the network. In an example, the data management engine 102 can further deploy the containerized layer 106*a* in a container 114 running on the first node 110*a*. The software application 124 can be a containerized application deployed within the container 114. Thus, deploying the containerized layer 106*a* in the container 114 can provide the software application 124 native access to the aggregated data 108*a*. The deployment of the containerized layer 106*a* in the container can include the containerized layer 106*a* being downloaded at the first node 110*a* from the container registry 104 and integrated with the container 114.

In some examples, similar data obtained via other publish-subscribe topics can be combined with the data 108*a* aggregated by the publish-subscribe topic 116*a* and stored in the containerized layer 106*a*. In this way, additional, relevant data can be received at the software application 124. For example, the data management engine 102 can generate a second publish-subscribe topic 116*b* based on a second set of data parameters 118*b* received from a second software application running on another node in the distributed computing environment 100. For example, the second software application can be another navigation application running on a navigation system of a vehicle. The data management engine 102 can then receive second data satisfying the second set of data parameters 118*b* via the second publish-subscribe topic 116*b* and store the second data in the containerized layer 106*a*. The containerized layer 106*a* may also be deployed in a container with the navigation application at the vehicle. Therefore, the containerized layer 106*a* can provide various devices within the distributed computing environment 100 efficient access to the data 108*a*.

Additionally, in some examples, the data management engine 102 can update the containerized layer 106*a* or generate new versions of the containerized layer 106*a*. In this way, the data management engine 102 can ensure that the first node 110*a* or other suitable devices using the containerized layer 106*a* to obtain data can access up-to-date data. For example, the data 108*a* may have been obtained during a first period of time. The data management engine 102 may then obtain additional data 108*b* during a second, subsequent period of time. The additional data 108*b* can be aggregated according to the set of data parameters 118*a*. For example, the publish-subscribe topic 116*a* can be used again or the data management engine 102 can generate a similar publish-subscribe topic according to the data parameters 118*a*. Once the additional data 108*b* is aggregated, the data management engine 102 can update the data in the containerized layer 106*a* or the data management engine 102 may assemble a second version of the containerized layer 106*b*. The second version of the containerized layer 106*b* can include the second data 108*b* and access mechanisms 112*b* for the second data 108*b*.

While FIG. 1 depicts a specific arrangement of components, other examples can include more components, fewer components, different components, or a different arrangement of the components than is shown in FIG. 1. For instance, in other examples, the distributed computing environment 100 can include a different number of nodes or the data management engine can be executing on one of the nodes. Additionally, any component or combination of components depicted in FIG. 1 can be used to implement the process(es) described herein.

Figure 2:
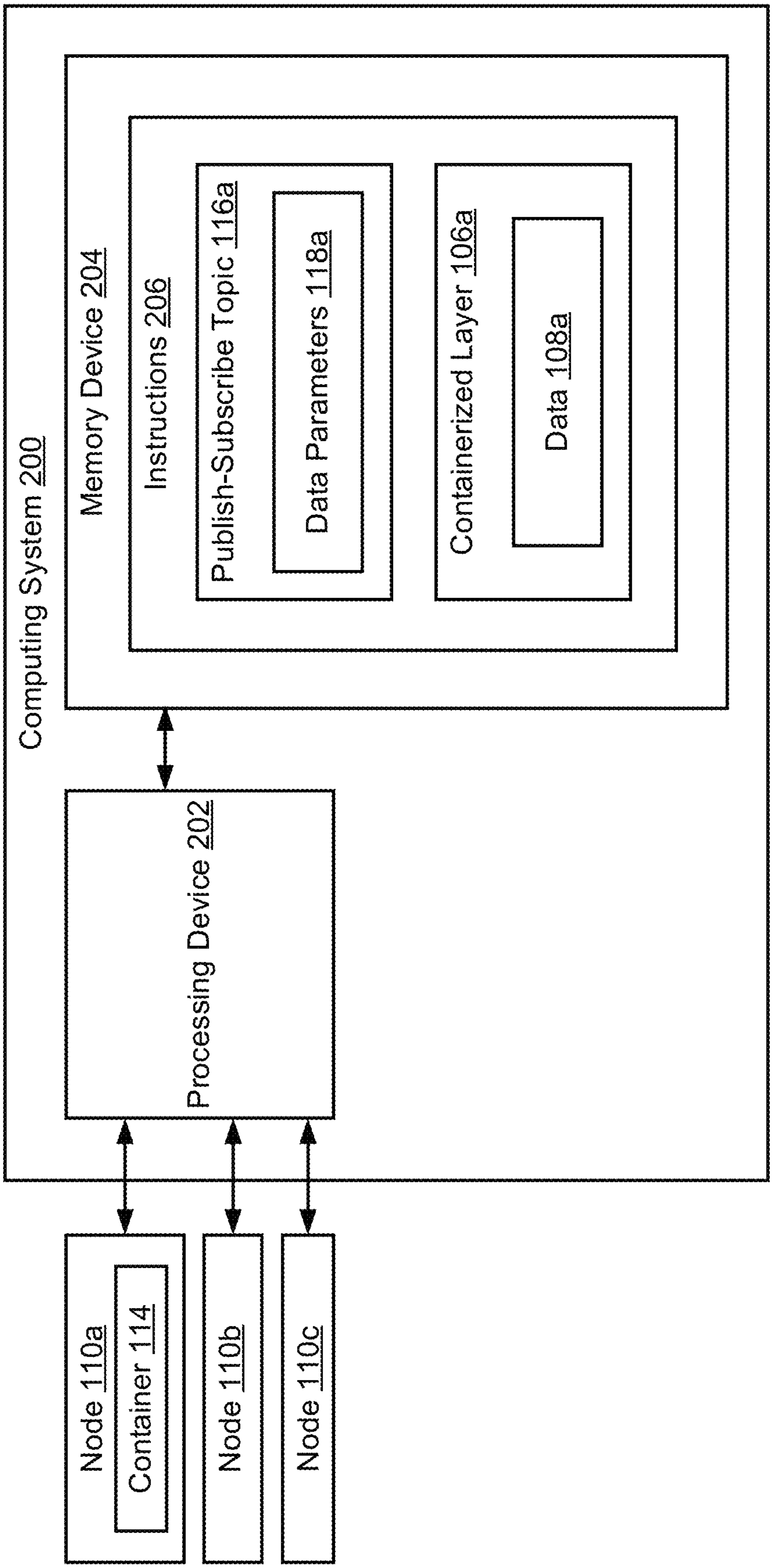
FIG. 2 is a block diagram of an example of a computing system for building containerized layers using publish-subscribe topics to facilitate software application data consumption according to some aspects of the present disclosure.

FIG. 2 is a block diagram of an example of a computing system 200 for building containerized layers using publish-subscribe topics to facilitate software application data consumption according to some aspects of the present disclosure. The computing system 200 can include a processing device 202 communicatively coupled to a memory device 204. In some examples, the data management engine 102 can be part of or can be communicatively coupled to the computing system 200, for example via a network (e.g., the network 120 of FIG. 1). In such examples, the processing device 202 can execute the data management engine 102 to perform any of the operations of the data management engine 102 described herein.

The processing device 202 can include one processing device or multiple processing devices. Non-limiting examples of the processing device 202 include a Field-Programmable Gate Array (FPGA), an application-specific integrated circuit (ASIC), and a microprocessor. The processing device 202 can execute instructions 206 stored in the memory device 204 to perform operations. In some examples, the instructions 206 can include processor-specific instructions generated by a compiler or an interpreter from code written in any suitable computer-programming language, such as C, C++, C#, Java, Python, or any combination of these.

The memory device 204 can include one memory device or multiple memory devices. The memory device 204 can be non-volatile and may include any type of memory device that retains stored information when powered off. Non-limiting examples of the memory device 204 include electrically erasable and programmable read-only memory (EEPROM), flash memory, or any other type of non-volatile memory. At least some of the memory device 204 includes a non-transitory computer-readable medium from which the processing device 202 can read instructions 206. A computer-readable medium can include electronic, optical, magnetic, or other storage devices capable of providing the processing device 202 with the instructions 206 or other program code. Non-limiting examples of a computer-readable medium include magnetic disk(s), memory chip(s), ROM, random-access memory (RAM), an ASIC, a configured processing device, and optical storage.

In some examples, the processing device 202 can execute the instructions 206 to perform operations. For example, the processing device 202 can receive data 108*a* that satisfies a set of data parameters 118*a* using a publish-subscribe topic 116*a*. The publish-subscribe topic 116*a* can be a logical channel for receiving a plurality of data streams from a plurality of computing nodes 110*a-c* in a distributed computing environment (e.g., distributed computing environment 100 depicted in FIG. 1). The plurality of data streams can include the data 108*a*. The processing device 202 can then assemble one or more containerized layers 106*a*, which can include the data 108*a*. The processing device 202 can further deploy the one or more containerized layers 106*a* in a container 114 at a computing node 110*a* of the plurality of computing nodes 110*a-c*.

Figure 3:
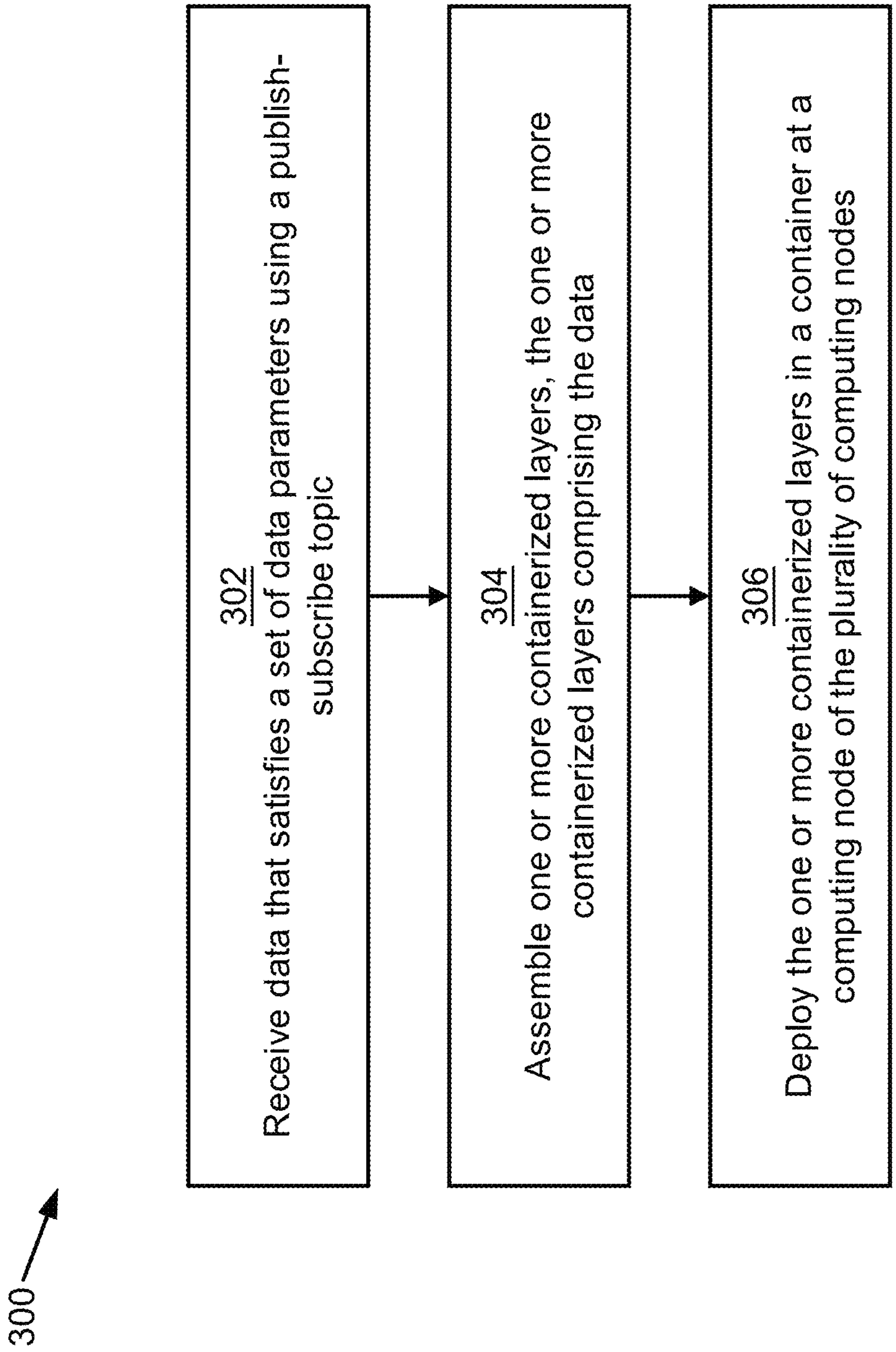
FIG. 3 is a flowchart of an example of a process for building containerized layers using publish-subscribe topics to facilitate software application data consumption according to some aspects of the present disclosure.

FIG. 3 is a flowchart of an example of a process 300 for building containerized layers using publish-subscribe topics to facilitate software application data consumption according to some aspects of the present disclosure. In some examples, a processing device 202 can perform one or more of the steps shown in FIG. 3. The processing device 202 may additionally or alternatively execute the data management engine 102 of FIG. 1 to perform one or more of the steps shown in FIG. 3. In other examples, the processing device 202 can implement more steps, fewer steps, different steps, or a different order of the steps depicted in FIG. 3. The steps of FIG. 3 are described below with reference to components discussed above in FIGS. 1-2.

In block 302, a processing device 202 can receive data 108*a* that satisfies a set of data parameters 118*a* using a publish-subscribe topic 116*a*. The publish-subscribe topic 116*a* can be a logical channel for receiving data streams from a plurality of computing nodes in a distributed computing environment (e.g., computing nodes 110*b-c* in distributed computing environment 100). The publish-subscribe topic 116*a* can include publishers (e.g., nodes 110*b-c*) which can send data and subscribers which can receive the data. In this case, storage of a computing device 200 associated with the processing device 202 can be the subscriber to the publish-subscribe topic 116*a*. In some examples, publishers can be configured to send the data by the processing device 202 deploying a producer program at each publisher. The publish-subscribe topic 116*a* can include data fields which govern which data from each of the publishers is received, which data is transmitted to the subscribers, or a combination thereof. The data fields can correspond to the set of data parameters 118*a* to facilitate the retrieval of relevant data by the processing device 202.

In block 304, the processing device 202 can assemble one or more containerized layers 106*a* comprising the data 108*a*. To do so, the processing device 202 may store the data 108*a* in files or the like in the containerized layer 106*a*. In addition to storing the data 108*a*, the containerized layer 106*a* can include access mechanisms for the data. For example, database drivers (e.g., SQL drivers, MongoDB drivers, or the like) can be included in the containerized layer 106*a*. The drivers can be used to access the data 108*a* at the locations (e.g., nodes 110*b-c*) from which the data 108*a* was obtained.

In block 306, the processing device 202 can deploy the one or more containerized layers 106*a* in a container 114 at a computing node 110*a* of the plurality of computing nodes 110*a-c*. For example, the containerized layer 106*a* can be downloaded from a container registry 104 and integrated with the container 114. In this way, a containerized application 124 within the container 114 can have native access to the data 108*a*. In comparison with the node 110*a* continuously receiving, processing, storing, or a combination thereof the data directly from the nodes 110*b-c*, computing resources and battery power of the node 110*a* can be used more efficiently by the application 124 having access to the data 108*a* via the containerized layer 106*a*.

The above description of certain examples, including illustrated examples, has been presented only for the purpose of illustration and description and is not intended to be exhaustive or to limit the disclosure to the precise forms disclosed. Modifications, adaptations, and uses thereof will be apparent to those skilled in the art without departing from the scope of the disclosure. For instance, any examples described herein can be combined with any other examples.

What is claimed is:

1. A system comprising:

a processing device; and a memory device including instructions that are executable by the processing device for causing the processing device to perform operations comprising:

generating a publish-subscribe topic by setting data fields of a software program based on a set of data parameters;

deploying the software program at a plurality of computing nodes in a distributed computing environment;

subsequent to deploying the software program, receiving, via the software program, data that satisfies the set of data parameters from the plurality of computing nodes in the distributed computing environment;

detecting, based on a data parameter of the set of data parameters, that the publish-subscribe topic has expired;

in response to detecting that the publish-subscribe topic has expired, assembling one or more containerized layers, the one or more containerized layers comprising the data;

storing the one or more containerized layers in a container registry; and downloading, from the container registry, the one or more containerized layers to a computing node of the distributed computing environment that is separate from the plurality of computing nodes and integrating the one or more containerized layers with a container executing at the computing node to provide the computing node with native access to the one or more containerized layers.

2. The system of claim 1, wherein the operations further comprise:

receiving the set of data parameters from the computing node.

3. The system of claim 1, wherein the operations further comprise:

providing access for the computing node to the container registry.

4. The system of claim 1, wherein the publish-subscribe topic is a logical channel for receiving a plurality of data streams from the plurality of computing nodes in the distributed computing environment and wherein the operations further comprise:

receiving second data that satisfies a second set of data parameters using a second publish-subscribe topic, the second publish-subscribe topic being another logical channel for receiving at least one data stream from at least one of the plurality of computing nodes in the distributed computing environment, the at least one data stream being different from the plurality of data streams and the at least one data stream comprising the second data; and wherein the one or more containerized layers further comprises the second data.

5. The system of claim 1, wherein the data is first data, and wherein the operation of receiving the first data occurs during a first period of time, and wherein the operations further comprise generating another version of the one or more containerized layers by:

receiving, during a second period of time, second data that satisfies the set of data parameters using the publish-subscribe topic; and assembling a second version of the one or more containerized layers, the second version of the one or more containerized layers comprising the second data.

6. A computer-implemented method comprising:

generating a publish-subscribe topic by setting data fields of a software program based on a set of data parameters;

deploying the software program at a plurality of computing nodes in a distributed computing environment;

subsequent to deploying the software program, receiving data, via the software program, that satisfies the set of data parameters from the plurality of computing nodes in the distributed computing environment;

detecting, based on a data parameter of the set of data parameters, that the publish-subscribe topic has expired;

in response to detecting that the publish-subscribe topic has expired, assembling one or more containerized layers, the one or more containerized layers comprising the data;

storing the one or more containerized layers in a container registry; and downloading, from the container registry, the one or more containerized layers to a computing node of the distributed computing environment that is separate from the plurality of computing nodes and integrating the one or more containerized layers with a container executing at the computing node to provide the computing node with native access to the one or more containerized layers.

7. The computer-implemented method of claim 6, further comprising:

receiving the set of data parameters from the computing node.

8. The computer-implemented method of claim 6, further comprising:

providing access for the computing node to the container registry.

9. The computer-implemented method of claim 6, wherein the publish-subscribe topic is a logical channel for receiving a plurality of data streams from the plurality of computing nodes in the distributed computing environment and wherein the computer-implemented method further comprises:

receiving second data that satisfies a second set of data parameters using a second publish-subscribe topic, the second publish-subscribe topic being another logical channel for receiving at least one data stream from at least one of the plurality of computing nodes in the distributed computing environment, the at least one data stream being different from the plurality of data streams and the at least one data stream comprising the second data; and wherein the one or more containerized layers further comprises the second data.

10. The computer-implemented method of claim 6, wherein the data is first data, wherein receiving the first data occurs during a first period of time, and wherein the method further comprises generating another version of the one or more containerized layers by:

receiving, during a second period of time, second data that satisfies the set of data parameters using the publish-subscribe topic; and assembling a second version of the one or more containerized layers, the second version of the one or more containerized layers comprising the second data.

11. A non-transitory computer-readable medium comprising program code executable by a processing device for causing the processing device to perform operations comprising:

generating a publish-subscribe topic by setting data fields of a software program based on a set of data parameters;

deploying the software program at a plurality of computing nodes in a distributed computing environment;

subsequent to deploying the software program, receiving, via the software program, data that satisfies the set of data parameters from the plurality of computing nodes in the distributed computing environment;

detecting, based on a data parameter of the set of data parameters, that the publish-subscribe topic has expired;

in response to detecting that the publish-subscribe topic has expired, assembling one or more containerized layers, the one or more containerized layers comprising the data;

storing the one or more containerized layers in a container registry; and downloading, from the container registry, the one or more containerized layers to a computing node of the distributed computing environment that is separate from the plurality of computing nodes and integrating the one or more containerized layers with a container executing at the computing node to provide the computing node with native access to the one or more containerized layers.

12. The non-transitory computer-readable medium of claim 11, wherein the operations further comprise:

receiving the set of data parameters from the computing node.

13. The non-transitory computer-readable medium of claim 11, wherein the operations further comprise:

providing access for the computing node to the container registry.

14. The non-transitory computer-readable medium of claim 11, wherein the publish-subscribe topic is a logical channel for receiving a plurality of data streams from the plurality of computing nodes in the distributed computing environment and wherein the operations further comprise:

receiving second data that satisfies a second set of data parameters using a second publish-subscribe topic, the second publish-subscribe topic being another logical channel for receiving at least one data stream from at least one of the plurality of computing nodes in the distributed computing environment, the at least one data stream being different from the plurality of data streams and the at least one data stream comprising the second data; and wherein the one or more containerized layers further comprises the second data.

* * * * *